United States Patent
Yu

(10) Patent No.: US 12,158,672 B2
(45) Date of Patent: Dec. 3, 2024

(54) ARRAY SUBSTRATE, MANUFACTURING METHOD THEREOF, AND DISPLAY PANEL

(71) Applicant: Guangzhou China Star Optoelectronics Semiconductor Display Technology Co., LTD., Guangdong (CN)

(72) Inventor: Jing Yu, Guangdong (CN)

(73) Assignee: Guangzhou China Star Optoelectronics Semiconductor Display Technology Co., LTD., Guangzhou (CN)

( * ) Notice: Subject to any disclaimer, the term of this patent is extended or adjusted under 35 U.S.C. 154(b) by 0 days.

(21) Appl. No.: 17/780,112

(22) PCT Filed: May 13, 2022

(86) PCT No.: PCT/CN2022/092838
§ 371 (c)(1),
(2) Date: Nov. 2, 2023

(87) PCT Pub. No.: WO2023/206629
PCT Pub. Date: Nov. 2, 2023

(65) Prior Publication Data
US 2024/0231160 A1    Jul. 11, 2024

(30) Foreign Application Priority Data
Apr. 25, 2022 (CN) .......................... 202210439899.1

(51) Int. Cl.
G02F 1/1343 (2006.01)
G02F 1/1362 (2006.01)

(52) U.S. Cl.
CPC ...... *G02F 1/134363* (2013.01); *G02F 1/1362* (2013.01)

(58) Field of Classification Search
CPC .......................... G02F 1/134363; G02F 1/1362
See application file for complete search history.

(56) References Cited

U.S. PATENT DOCUMENTS

| 6,392,731 B1 | 5/2002 | Satake et al. |
| 2003/0085406 A1 | 5/2003 | Cheng |
| 2014/0085557 A1* | 3/2014 | Kim .................. G02F 1/136227 438/30 |

FOREIGN PATENT DOCUMENTS

| CN | 1420554 | 5/2003 |
| CN | 103293811 | 9/2013 |

(Continued)

OTHER PUBLICATIONS

Notification of Office Action and Search Report Dated May 7, 2023 From The State Intellectual Property Office of the People's Republic of China Re. Application No. 202210439899.1 and Its Translation Into English. (18 Pages).

(Continued)

*Primary Examiner* — James A Dudek

(57) ABSTRACT

An array substrate, a manufacturing method thereof, and a display panel are provided. The array substrate includes a substrate layer, an insulating layer, a plurality of first electrodes, and a plurality of second electrodes. The plurality of first electrodes are disposed in the grooves, the plurality of second electrodes are disposed on one side surface of the insulating layer away from the substrate layer and outside the grooves, and the plurality of second electrodes and the plurality of first electrodes are insulated from each other.

20 Claims, 6 Drawing Sheets

(56) References Cited

FOREIGN PATENT DOCUMENTS

| | | |
|---|---|---|
| CN | 103698950 | 4/2014 |
| CN | 103969897 | 8/2014 |
| CN | 104503163 | 4/2015 |
| CN | 106024808 | 10/2016 |
| CN | 106094366 | 11/2016 |
| CN | 114355685 | 4/2022 |
| JP | 11-125840 | 5/1999 |
| JP | 2010-122704 | 6/2010 |
| KR | 1998-0040331 | 8/1998 |

OTHER PUBLICATIONS

International Search Report and the Written Opinion Dated Dec. 15, 2022 From the International Searching Authority Re. Application No. PCT/CN2022/092838 and Its Translation Into English. (16 Pages).

* cited by examiner

ARRAY SUBSTRATE, MANUFACTURING METHOD THEREOF, AND DISPLAY PANEL

RELATED APPLICATIONS

This application is a National Phase of PCT Patent Application No. PCT/CN2022/092838 having International filing date of May 13, 2022, which claims the benefit of priority of Chinese Patent Application No. 202210439899.1 filed on Apr. 25, 2022. The contents of the above applications are all incorporated by reference as if fully set forth herein in their entirety.

FIELD AND BACKGROUND OF THE INVENTION

The present disclosure relates to the field of display technologies, and more particularly, to an array substrate, a manufacturing method thereof, and a display panel.

In-Plane Switching (IPS) array substrates use an electric field that is roughly parallel to substrate surfaces to drive liquid crystal molecules to rotate along the substrate surfaces. Since the IPS type array substrates design pixel electrodes and common electrodes as a structure having one-time film formation, in order to ensure different electrodes to be insulated from each other, a line spacing needs to be defined between the electrodes. However, this line spacing is not helpful for transmittance and wastes opening spaces, thereby reducing the transmittance.

Therefore, it is necessary to improve this defect.

Technical problem: an embodiment of the present disclosure provides an array substrate to solve the technical problem of low transmittance in current array substrates.

SUMMARY OF THE INVENTION

An embodiment of the present disclosure provides an array substrate, which includes a substrate layer, an insulating layer, a plurality of first electrodes, and a plurality of second electrodes. The insulating layer is disposed on the substrate layer and is defined with a plurality of grooves on one side away from the substrate layer. The plurality of first electrodes are disposed in the grooves. The plurality of second electrodes are disposed on one side surface of the insulating layer away from the substrate layer and outside the grooves, and the plurality of second electrodes and the plurality of first electrodes are insulated from each other.

In the array substrate provided in an embodiment of the present disclosure, the plurality of first electrodes and the plurality of second electrodes are formed by a same metal deposition process.

In the array substrate provided in an embodiment of the present disclosure, the plurality of first electrodes include a first trunk electrode and a plurality of first branch electrodes arranged in parallel, and the first branch electrodes are electrically connected to the first trunk electrode; the plurality of second electrodes include a second trunk electrode and a plurality of second branch electrodes arranged in parallel, and the second branch electrodes are electrically connected to the second trunk electrode; and a spacing between an orthographic projection of the first branch electrodes on the substrate layer and an orthographic projection of adjacent second branch electrodes on the substrate layer is greater than or equal to 0 and is less than or equal to 0.5 µm.

In the array substrate provided in an embodiment of the present disclosure, a spacing between an orthographic projection of the first branch electrodes on the substrate layer in a middle area and an orthographic projection of the second trunk electrode on the substrate layer is greater than a spacing between an orthographic projection of the first branch electrodes on the substrate layer in an edge area and the orthographic projection of the second trunk electrode on the substrate layer; and/or a spacing between an orthographic projection of the second branch electrodes on the substrate layer in the middle area and an orthographic projection of the first trunk electrode on the substrate layer is greater than a spacing between an orthographic projection of the second branch electrodes on the substrate layer in the edge area and the orthographic projection of the first trunk electrode on the substrate layer.

In the array substrate provided in an embodiment of the present disclosure, in a direction perpendicular to a direction from the substrate layer to the insulating layer, a width of the first branch electrodes in an edge area is greater than a width of the first branch electrodes in a middle area; and/or a width of the second branch electrodes in the edge area is greater than a width of the second branch electrodes in the middle area.

In the array substrate provided in an embodiment of the present disclosure, in a direction from the substrate layer to the insulating layer, a spacing between the first branch electrodes in a middle area and the second branch electrodes adjacent to the first branch electrodes in the middle area is greater than a spacing between the first branch electrodes in an edge area and the second branch electrodes adjacent to the first branch electrodes in the edge area.

In the array substrate provided in an embodiment of the present disclosure, in a direction from the substrate layer to the insulating layer, a spacing between the plurality of first electrodes and the plurality of second electrodes adjacent to the plurality of first electrodes is a first value, a film layer thickness of the plurality of first electrodes is a second value, and a ratio of the first value to the second value is greater than 10.

In the array substrate provided in an embodiment of the present disclosure, the first value is greater than or equal to 4000 angstroms and is less than or equal to 20000 angstroms, and the second value is greater than or equal to 300 angstroms and is less than or equal to 1000 angstroms.

In the array substrate provided in an embodiment of the present disclosure, an included angle formed between a side wall of the grooves and a bottom surface of the grooves is greater than 0 and is less than or equal to 90 degrees.

An embodiment of the present disclosure provides a manufacturing method of an array substrate. The method includes following steps: manufacturing an insulating layer on a substrate layer; defining a plurality of grooves on one side of the insulating layer away from the substrate layer; and manufacturing a metal layer on the insulating layer, wherein, the metal layer includes a plurality of first electrodes and a plurality of second electrodes insulated from the plurality of first electrodes, the plurality of first electrodes are disposed in the grooves, and the plurality of second electrodes are disposed on one side surface of the insulating layer away from the substrate layer and outside the grooves.

In the manufacturing method of the array substrate provided in an embodiment of the present disclosure, an included angle formed between a side wall of the grooves and a bottom surface of the grooves is greater than 0 and is less than or equal to 90 degrees.

An embodiment of the present disclosure further provides a display panel, which includes a color filter substrate and an array substrate, wherein, the color filter substrate is disposed opposite to the array substrate. The array substrate includes a substrate layer, an insulating layer, a plurality of first electrodes, and a plurality of second electrodes. The insulating layer is disposed on the substrate layer and is defined with a plurality of grooves on one side away from the substrate layer. The plurality of first electrodes are disposed in the grooves, the plurality of second electrodes are disposed on one side surface of the insulating layer away from the substrate layer and outside the grooves, and the plurality of second electrodes and the plurality of first electrodes are insulated from each other.

In the display panel provided in an embodiment of the present disclosure, the plurality of first electrodes and the plurality of second electrodes are formed by a same metal deposition process.

In the display panel provided in an embodiment of the present disclosure, the plurality of first electrodes include a first trunk electrode and a plurality of first branch electrodes arranged in parallel, and the first branch electrodes are electrically connected to the first trunk electrode; the plurality of second electrodes include a second trunk electrode and a plurality of second branch electrodes arranged in parallel, and the second branch electrodes are electrically connected to the second trunk electrode; and a spacing between an orthographic projection of the first branch electrodes on the substrate layer and an orthographic projection of adjacent second branch electrodes on the substrate layer is greater than or equal to 0 and is less than or equal to 0.5 μm.

In the display panel provided in an embodiment of the present disclosure, a spacing between an orthographic projection of the first branch electrodes on the substrate layer in a middle area and an orthographic projection of the second trunk electrode on the substrate layer is greater than a spacing between an orthographic projection of the first branch electrodes on the substrate layer in an edge area and the orthographic projection of the second trunk electrode on the substrate layer; and/or a spacing between an orthographic projection of the second branch electrodes on the substrate layer in the middle area and an orthographic projection of the first trunk electrode on the substrate layer is greater than a spacing between an orthographic projection of the second branch electrodes on the substrate layer in the edge area and the orthographic projection of the first trunk electrode on the substrate layer.

In the display panel provided in an embodiment of the present disclosure, in a direction perpendicular to a direction from the substrate layer to the insulating layer, a width of the first branch electrodes in an edge area is greater than a width of the first branch electrodes in a middle area; and/or a width of the second branch electrodes in the edge area is greater than a width of the second branch electrodes in the middle area.

In the display panel provided in an embodiment of the present disclosure, in a direction from the substrate layer to the insulating layer, a spacing between the first branch electrodes in a middle area and the second branch electrodes adjacent to the first branch electrodes in the middle area is greater than a spacing between the first branch electrodes in an edge area and the second branch electrodes adjacent to the first branch electrodes in the edge area.

In the display panel provided in an embodiment of the present disclosure, in a direction from the substrate layer to the insulating layer, a spacing between the plurality of first electrodes and the plurality of second electrodes adjacent to the plurality of first electrodes is a first value, a film layer thickness of the plurality of first electrodes is a second value, and a ratio of the first value to the second value is greater than 10.

In the display panel provided in an embodiment of the present disclosure, the first value is greater than or equal to 4000 angstroms and is less than or equal to 20000 angstroms, and the second value is greater than or equal to 300 angstroms and is less than or equal to 1000 angstroms.

In the display panel provided in an embodiment of the present disclosure, an included angle formed between a side wall of the grooves and a bottom surface of the grooves is greater than 0 and is less than or equal to 90 degrees.

Beneficial effect: the embodiments of the present disclosure provide the array substrate, which includes the substrate layer, the insulating layer, the plurality of first electrodes, and the plurality of second electrodes. The insulating layer is disposed on the substrate layer and is defined with the plurality of grooves on one side away from the substrate layer. The plurality of first electrodes are disposed in the grooves, the plurality of second electrodes are disposed on one side surface of the insulating layer away from the substrate layer and outside the grooves, and the plurality of second electrodes and the plurality of first electrodes are insulated from each other. In the present disclosure, by disposing the plurality of first electrodes in the grooves and disposing the plurality of second electrodes on the side surface of the insulating layer away from the substrate layer and outside the grooves, a certain spacing can be formed between the plurality of first electrodes located in the grooves and adjacent second electrodes located outside the grooves in a direction perpendicular to a plane where the array substrate is located. Therefore, the plurality of first electrodes being separated from the plurality of second electrodes in the direction perpendicular to the plane where the array substrate is located can be realized, a line spacing between the orthographic projection of the plurality of first electrodes on the substrate layer and the orthographic projection of the adjacent second electrodes on the substrate layer can be reduced or even eliminated, and the transmittance can be greatly improved.

DESCRIPTION OF SPECIFIC EMBODIMENTS OF THE INVENTION

Figure 1:
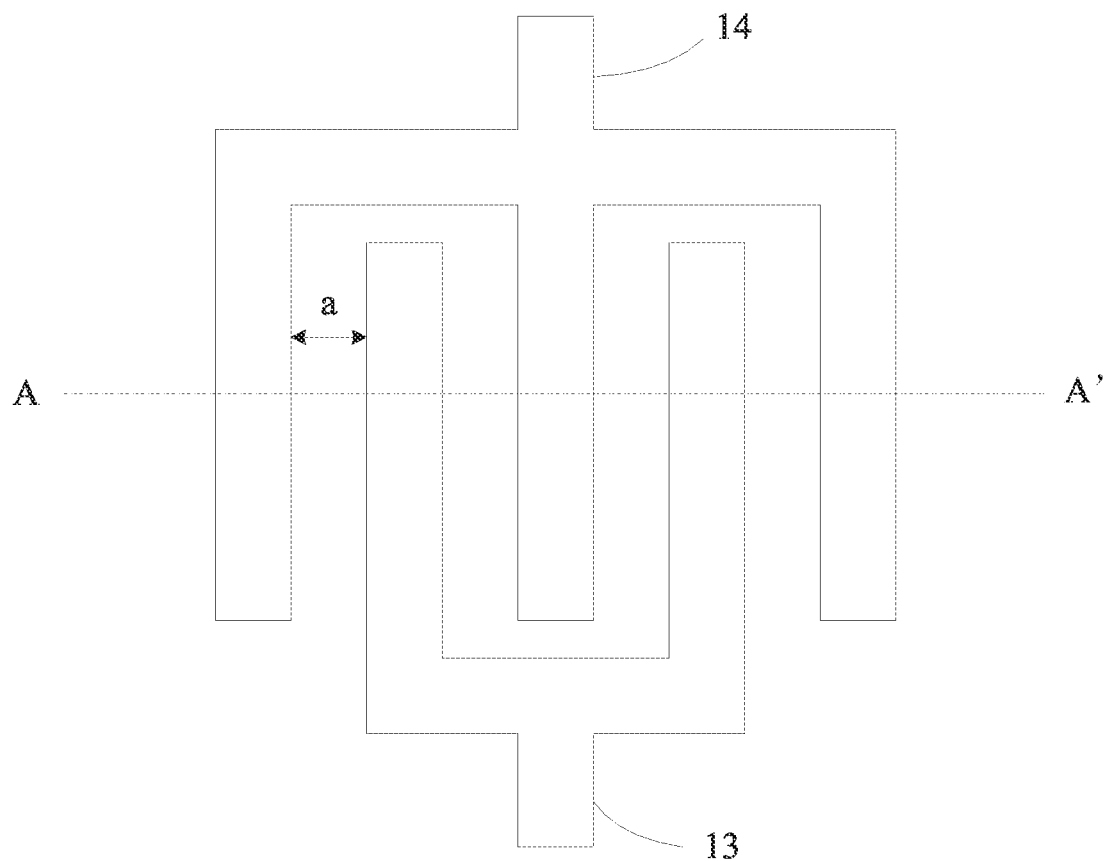
FIG. 1 is a schematic top view of a pixel electrode and a common electrode in current technology.

The technical solutions in the embodiments of the present disclosure will be clearly and completely described below with reference to the drawings in the embodiments of the present disclosure. In the drawings, for clarity and ease of understanding and description, the sizes and thicknesses of the components shown in the drawings are not to scale.

Figure 2:
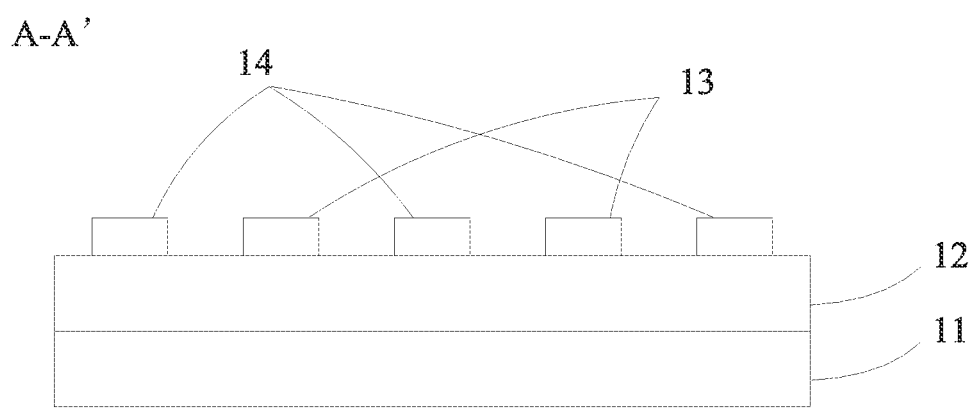
FIG. 2 is a schematic cross-sectional diagram of an array substrate in a direction of A-A' in FIG. 1.

As shown in FIGS. 1 and 2, FIG. 1 is a schematic top view of a pixel electrode and a common electrode in current technology, and FIG. 2 is a schematic cross-sectional diagram of an array substrate in a direction of A-A' in FIG. 1. The array substrate includes a substrate layer 11, an insulating layer 12 disposed on the substrate layer 11, and a pixel electrode 13 and a common electrode 14 disposed on the insulating layer 12. From FIG. 1, it can be clearly seen that a line spacing a is between the pixel electrode 13 and the common electrode 14. There are no electrodes in an area with the line spacing a, and no electric field can be generated, so this space is not used, which causes overall transmittance of the array substrate to decrease. The embodiments of the present disclosure can solve the above defect.

Figure 5:
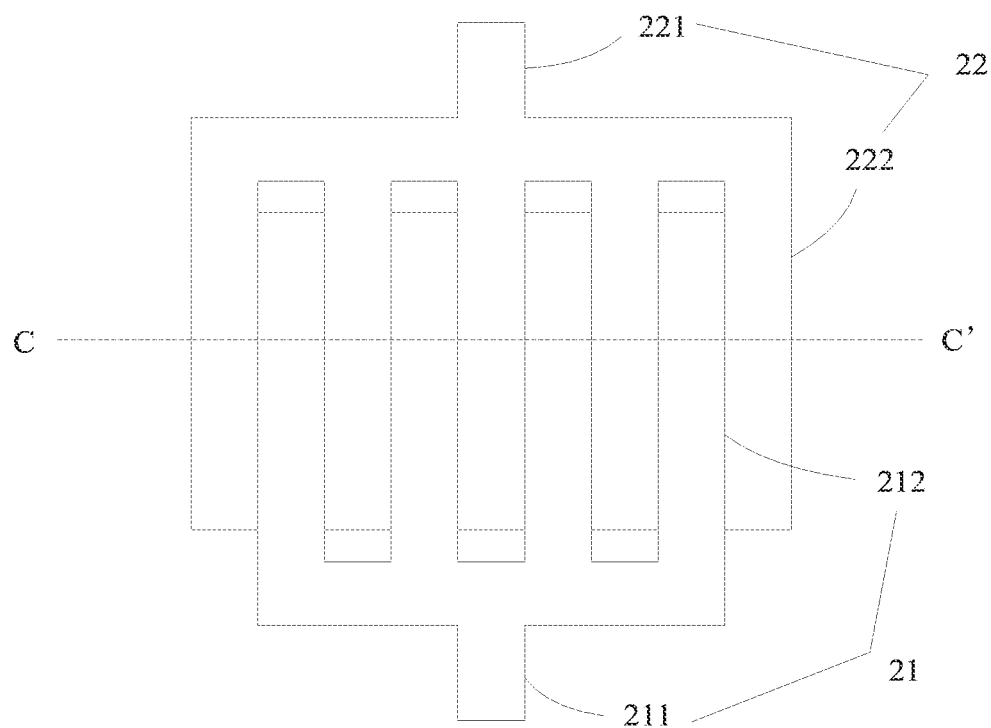
FIG. 5 is a schematic top view of a first electrode and a second electrode according to an embodiment of the present disclosure.
Figure 6:
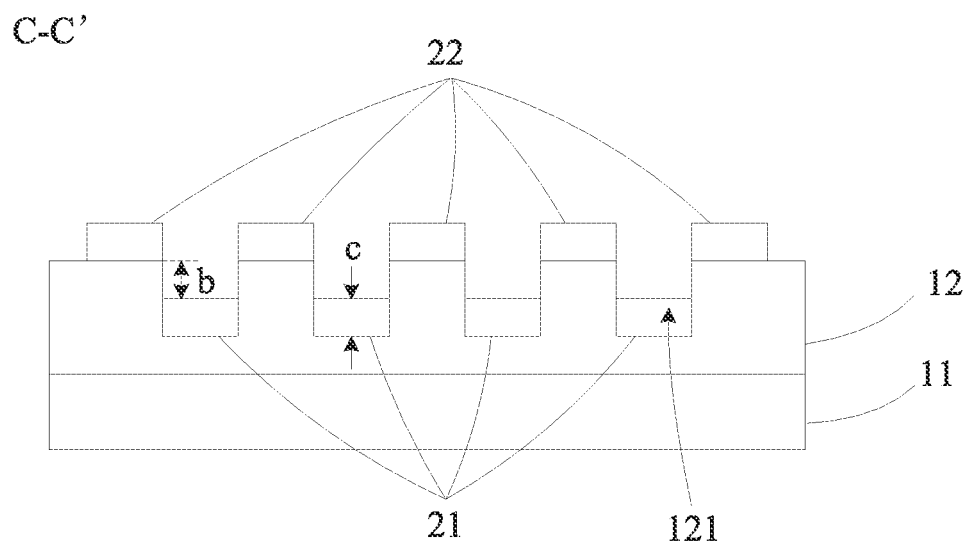
FIG. 6 is a schematic cross-sectional diagram of an array substrate in a direction of C-C' in FIG. 5 according to an embodiment of the present disclosure.

As shown in FIGS. 5 and 6, FIG. 5 is a schematic top view of a first electrode and a second electrode according to an embodiment of the present disclosure, and FIG. 6 is a schematic cross-sectional diagram of an array substrate in a direction of C-C' in FIG. 5 according to an embodiment of the present disclosure. The array substrate includes a substrate layer 11, an insulating layer 12, a plurality of first electrodes 21, and a plurality of second electrodes 22. The insulating layer 12 is disposed on the substrate layer 11 and is defined with a plurality of grooves 121 on one side away from the substrate layer 11. The plurality of first electrodes 21 are disposed in the grooves 121, the plurality of second electrodes 22 are disposed on one side surface of the insulating layer 12 away from the substrate layer 11 and outside the grooves 121, and the plurality of second electrodes 22 and the plurality of first electrodes 21 are insulated from each other.

It can be understood that in the embodiment, by defining the grooves 121 on the insulating layer 12, the insulating layer 12 can have two thicknesses in a direction perpendicular to a plane where the array substrate is located (that is, a vertical direction), and by disposing the plurality of first electrodes 21 in the grooves 121 and disposing the plurality of second electrodes 22 on the side surface of the insulating layer 12 away from the substrate layer 11 and outside the grooves 121, a certain spacing can be formed between the plurality of first electrodes 21 located in the grooves 121 and adjacent second electrodes 22 located outside the grooves 121 in the vertical direction. Therefore, the plurality of first electrodes 21 being separated from the plurality of second electrodes 22 in the vertical direction can be realized, and a line spacing (in a horizontal direction) between an orthographic projection of the plurality of first electrodes 21 on the substrate layer 11 and an orthographic projection of adjacent second electrodes 22 on the substrate layer 11 can be reduced or even eliminated, thereby greatly improving the transmittance.

It should be noted that the insulating layer 12 having two thicknesses in the vertical direction may be realized by a half-tone mask (HTM) process. In an embodiment, a material of the insulating layer 12 is silicon nitride.

It should be noted that the plurality of first electrodes 21 and the plurality of second electrodes 22 are respectively one of pixel electrodes or common electrodes and are different from each other. That is, when the plurality of first electrodes 21 are the pixel electrodes, the plurality of second electrodes 22 are the common electrodes, and when the plurality of first electrodes 21 are the common electrodes, the plurality of second electrodes 22 are the pixel electrodes.

In an embodiment, the plurality of first electrodes 21 and the plurality of second electrodes 22 are formed by a same metal deposition process.

Figure 3:
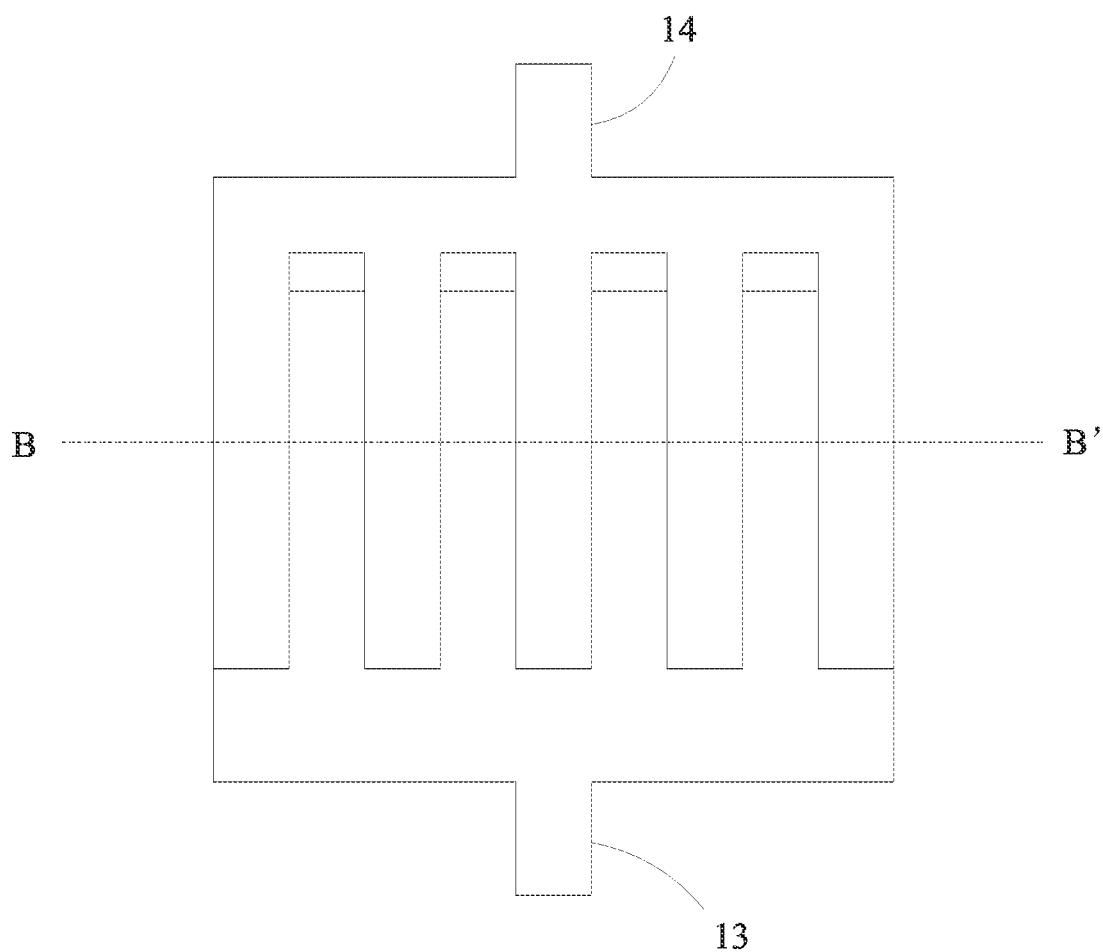
FIG. 3 is a schematic top view of another pixel electrode and another common electrode in current technology.
Figure 4:
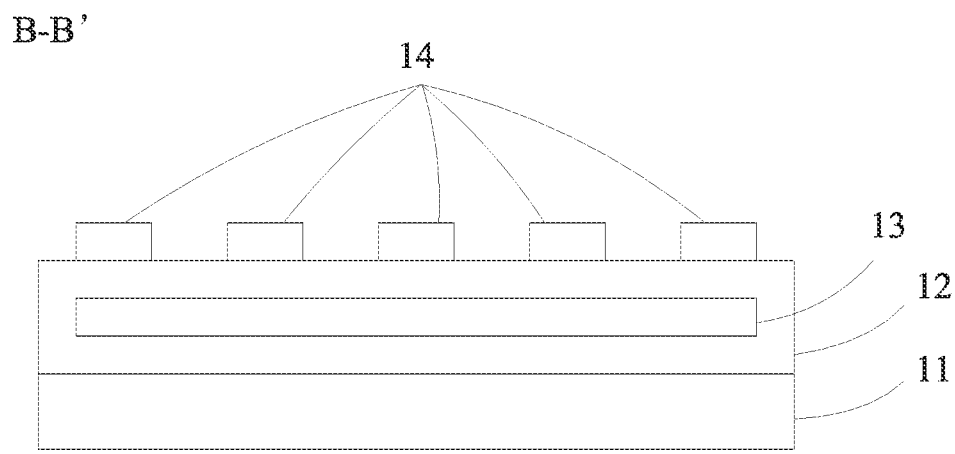
FIG. 4 is a schematic cross-sectional diagram of another array substrate in a direction of B-B' in FIG. 3.

It can be understood that as shown in FIGS. 3 and 4, FIG. 3 is a schematic top view of another pixel electrode and another common electrode in current technology, and FIG. 4 is a schematic cross-sectional diagram of another array substrate in a direction of B-B' in FIG. 3. The array substrate in FIGS. 3 and 4 eliminates the line spacing a in FIGS. 1 and 2 by disposing the pixel electrode 13 and the common electrode 14 on different layers, thereby improving the transmittance. However, the pixel electrode 13 and the common electrode 14 in FIGS. 3 and 4 need to be prepared separately. Therefore, compared to the pixel electrode 13 and the common electrode 14 in FIGS. 1 and 2, one more mask process is required, resulting in high cost and complexity. In this embodiment, the plurality of first electrodes 21 and the plurality of second electrodes 22 are formed by the same metal deposition process. Specifically, when a metal layer is deposited on the insulating layer 12, a part of the metal layer falls into the grooves 121 and forms the plurality of first electrodes 21, and another part of the metal layer falls on the side surface of the insulating layer 12 away from the substrate layer 11 and outside the grooves 121 and forms the plurality of second electrodes 22. Therefore, there is no need to add an additional mask process, thereby reducing a manufacturing difficulty and saving a production cost.

Referring to FIG. 5, in an embodiment, the plurality of first electrodes 21 include a first trunk electrode 211 and a plurality of first branch electrodes 212 arranged in parallel, and the first branch electrodes 212 are electrically connected to the first trunk electrode 211. The plurality of second electrodes 22 include a second trunk electrode 221 and a plurality of second branch electrodes 222 arranged in parallel, and the second branch electrodes 222 are electrically connected to the second trunk electrode 221. Wherein, a spacing between an orthographic projection of the first branch electrodes 212 on the substrate layer 11 (as shown in FIG. 6) and an orthographic projection of adjacent second branch electrodes 222 on the substrate layer 11 is greater than or equal to 0 and is less than or equal to 0.5 μm. It can be understood that in this embodiment, by disposing the plurality of first electrodes 21 and the plurality of second electrodes 22 to mesh with each other, a distance between the plurality of first electrodes 21 and the plurality of second electrodes 22 can be reduced, thereby improving an electric field strength between the plurality of first electrodes 21 and the plurality of second electrodes 22.

Referring to FIG. 6, in an embodiment, in a direction from the substrate layer 11 to the insulating layer 12, a spacing between the plurality of first electrodes 21 and the plurality of second electrodes 22 adjacent to the plurality of first electrodes 21 is a first value b, a film layer thickness of the plurality of first electrodes 21 is a second value c, and a ratio b/c of the first value b to the second value c is greater than 10. It can be understood that if the ratio b/c is larger, in the direction from the substrate layer 11 to the insulating layer 12, the plurality of first electrodes 21 are farther from the plurality of second electrodes 22, and the plurality of first electrodes 21 are easier to be disconnected with the plurality of second electrodes 22. Therefore, if the ratio b/c is larger, it is better. In this embodiment, by setting the ratio b/c to be greater than 10, the plurality of first electrodes 21 and the plurality of second electrodes 22 can be disconnected without increasing mask processes.

In an embodiment, the first value b is greater than or equal to 4000 angstroms and is less than or equal to 20000 angstroms, and the second value c is greater than or equal to 300 angstroms and is less than or equal to 1000 angstroms.

Figure 7:
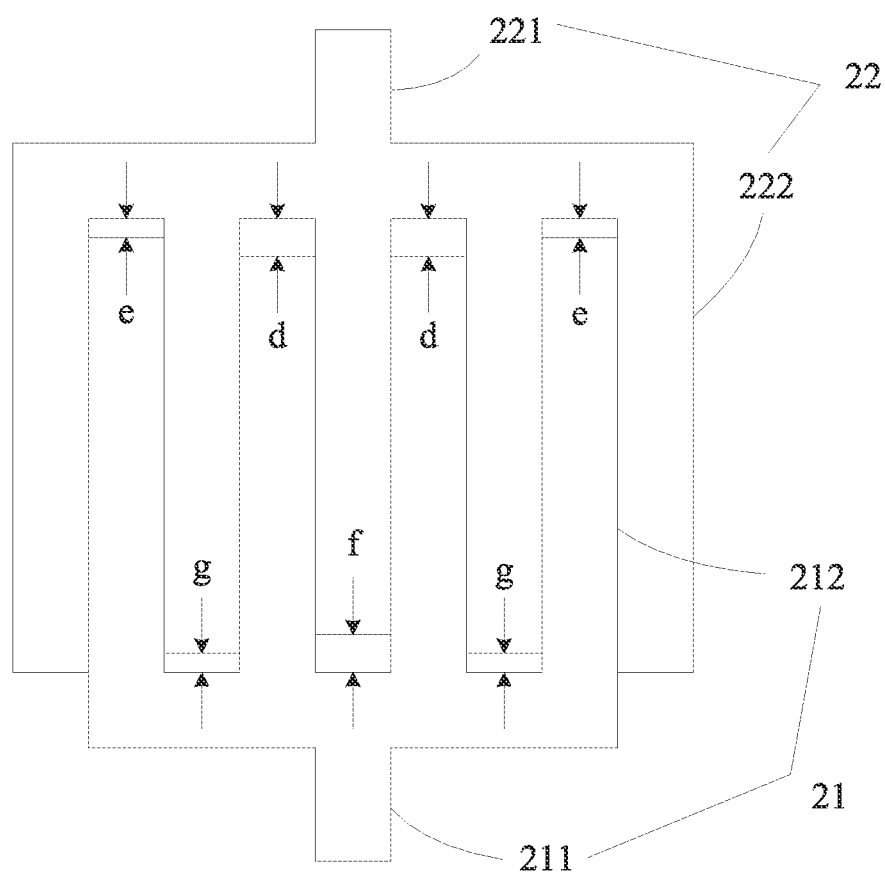
FIG. 7 is a schematic top view of another first electrode and another second electrode according to an embodiment of the present disclosure.

Referring to FIG. 7, FIG. 7 is a schematic top view of another first electrode and another second electrode according to an embodiment of the present disclosure. In this embodiment, a spacing d between an orthographic projection of the first branch electrodes 212 on the substrate layer 11 (as shown in FIG. 6) in a middle area and an orthographic projection of the second trunk electrode 221 on the substrate layer 11 is greater than a spacing e between an orthographic projection of the first branch electrodes 212 on the substrate layer 11 in an edge area and the orthographic projection of the second trunk electrode 221 on the substrate layer 11; and/or a spacing f between an orthographic projection of the second branch electrodes 222 on the substrate layer 11 in the middle area and an orthographic projection of the first trunk electrode 211 on the substrate layer 11 is greater than a spacing g between an orthographic projection of the second branch electrodes 222 on the substrate layer 11 in the edge area and the orthographic projection of the first trunk electrode 211 on the substrate layer 11.

It can be understood that in this embodiment, by reducing the spacing e between the orthographic projection of the first branch electrodes 212 on the substrate layer 11 in the edge area and the orthographic projection of the second trunk electrode 221 on the substrate layer 11 and/or the spacing g between the orthographic projection of the second branch electrodes 222 on the substrate layer 11 in the edge area and the orthographic projection of the first trunk electrode 211 on the substrate layer 11, the electric field strength in the edge area can be increased, thereby compensating insufficient brightness at edges of sub-pixels and improving display uniformity.

It should be noted that a spacing between an orthographic projection of the second branch electrodes 222 located at the utmost edges (that is, one side of g away from f) on the substrate layer 11 and the orthographic projection of the first trunk electrode 211 on the substrate layer 11 is 0.

Figure 8:
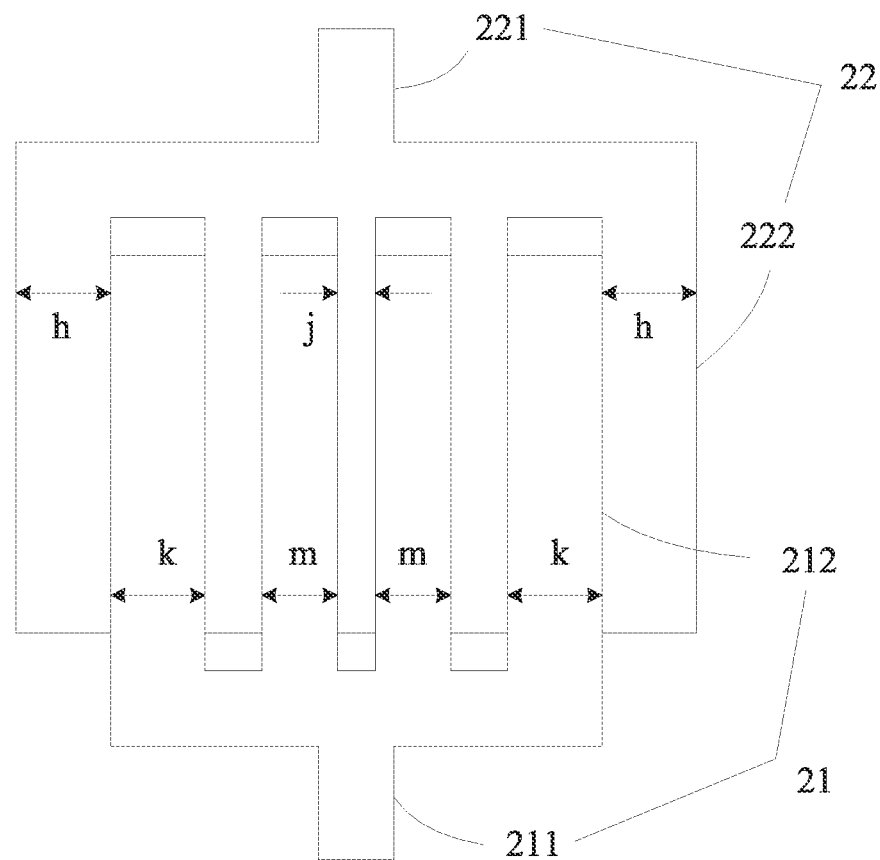
FIG. 8 is a schematic top view of yet another first electrode and yet another second electrode according to an embodiment of the present disclosure.

Referring to FIG. 8, FIG. 8 is a schematic top view of yet another first electrode and yet another second electrode according to an embodiment of the present disclosure. In this embodiment, in a direction perpendicular to the direction from the substrate layer 11 (as shown in FIG. 6) to the insulating layer 12 (as shown in FIG. 6), a width k of the first branch electrodes 212 in the edge area is greater than a width m of the first branch electrodes 212 in the middle area; and/or a width h of the second branch electrodes 222 in the edge area is greater than a width j of the second branch electrodes 222 in the middle area.

It can be understood that in this embodiment, in the direction perpendicular to the direction from the substrate layer 11 (as shown in FIG. 6) to the insulating layer 12 (as shown in FIG. 6), by increasing the width k of the first branch electrodes 212 in the edge area and/or the width h of the second branch electrodes 222 in the edge area, the electric field strength in the edge area can be increased, thereby compensating insufficient brightness at the edges of sub-pixels and improving display uniformity.

Figure 9:
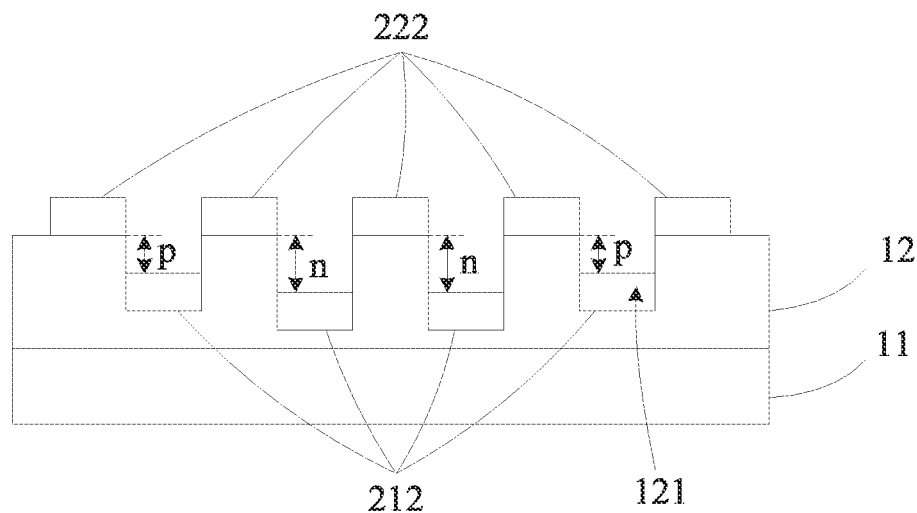
FIG. 9 is a schematic cross-sectional diagram of another array substrate according to an embodiment of the present disclosure.

Referring to FIG. 9, FIG. 9 is a schematic cross-sectional diagram of another array substrate according to an embodiment of the present disclosure. In this embodiment, in the direction from the substrate layer 11 to the insulating layer 12, a spacing n between the first branch electrodes 212 in the middle area and the second branch electrodes 222 adjacent to the first branch electrodes 212 in the middle area is greater than a spacing p between the first branch electrodes 212 in the edge area and the second branch electrodes 222 adjacent to the first branch electrodes 212 in the edge area.

It can be understood that in this embodiment, in the direction from the substrate layer 11 to the insulating layer 12, by reducing the spacing p between the first branch electrodes 212 in the edge area and the second branch electrodes 222 adjacent to the first branch electrodes 212 in the edge area, the electric field strength in the edge area can be increased, thereby compensating insufficient brightness at the edges of sub-pixels and improving display uniformity.

It should be noted that in the direction from the substrate layer 11 to the insulating layer 12, different spacings between the first branch electrodes 212 and adjacent second branch electrodes 222 are realized by setting depths of the grooves 121 on the insulating layer 12 to be different by the HTM process.

Figure 10:
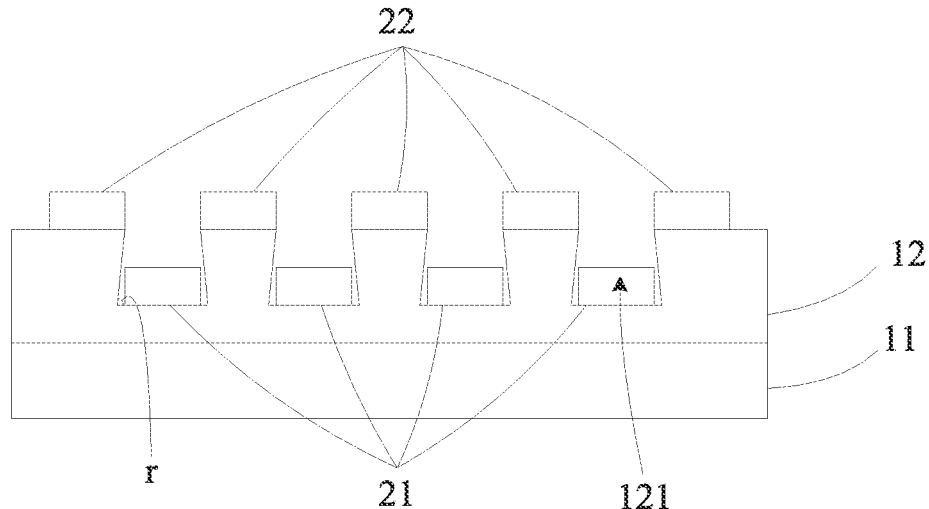
FIG. 10 is a schematic cross-sectional diagram of yet another array substrate according to an embodiment of the present disclosure.

Referring to FIG. 10, FIG. 10 is a schematic cross-sectional diagram of yet another array substrate according to an embodiment of the present disclosure. In this embodiment, an included angle r formed between a side wall of the grooves 121 and a bottom surface of the grooves 121 is greater than 0 and is less than or equal to 90 degrees.

It can be understood that the grooves 121 are formed by applying the HTM process to the insulating layer 12. Wherein, when the included angle r formed between the side wall of the grooves 121 and the bottom surface of the grooves 121 is smaller, it is better. Therefore, this is beneficial to realize that the plurality of first electrodes 21 are disconnected from the plurality of second electrodes 22 in the direction perpendicular to the plane where the array substrate is located.

Figure 11:
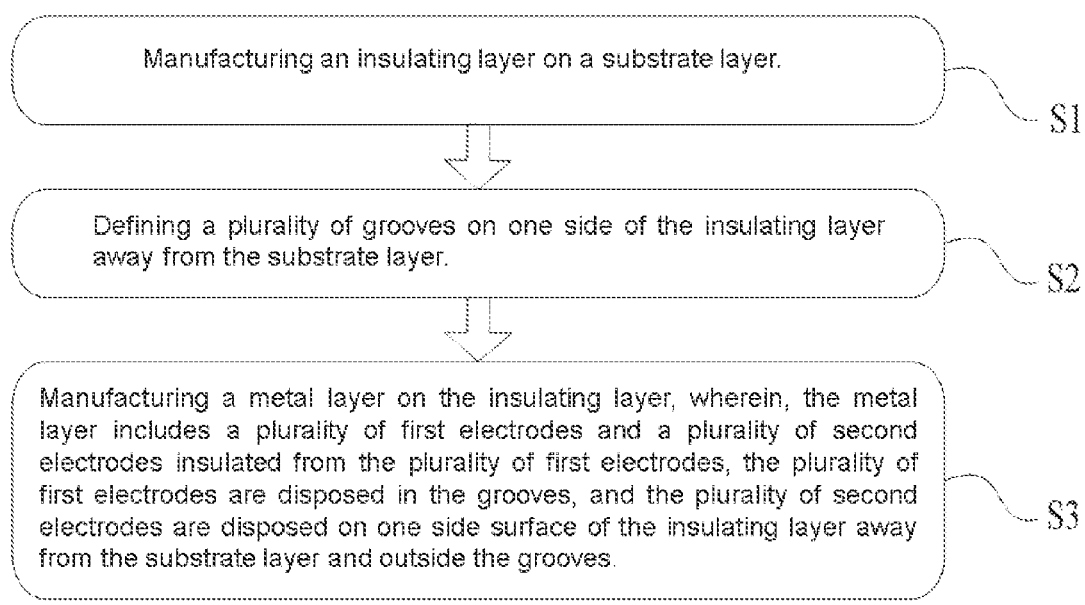
FIG. 11 is a flowchart of a manufacturing method of the array substrate according to an embodiment of the present disclosure.

Next, referring to FIG. 11, FIG. 11 is a flowchart of a manufacturing method of the array substrate according to an embodiment of the present disclosure. The manufacturing method includes following steps:

S1: manufacturing the insulating layer on the substrate layer;

S2: defining the plurality of grooves on one side of the insulating layer away from the substrate layer; and S3: manufacturing the metal layer on the insulating layer, wherein, the metal layer includes the plurality of first electrodes and the plurality of second electrodes insulated from the plurality of first electrodes, the plurality of first electrodes are disposed in the grooves, and the plurality of second electrodes are disposed on one side surface of the insulating layer away from the substrate layer and outside the grooves.

It can be understood that in this embodiment, the grooves are formed on the insulating layer by one mask process. When the metal layer is deposited on the insulating layer, a part of the metal layer falls into the grooves and forms the plurality of first electrodes, and another part of the metal layer falls on the side surface of the insulating layer away from the substrate layer and outside the grooves and forms the plurality of second electrodes. The plurality of first electrodes located in the grooves can be separated from the adjacent second electrodes located outside the grooves in the direction perpendicular to the plane where the array substrate is located. Therefore, the line spacing between the orthographic projection of the plurality of first electrodes on the substrate layer and the orthographic projection of the adjacent second electrodes on the substrate layer can be reduced or even eliminated, thereby greatly improving the transmittance. In addition, there is no need to add an additional mask process, thereby reducing the manufacturing difficulty and saving the production cost.

An embodiment of the present disclosure further provides a display panel, which includes a color filter substrate and the array substrate mentioned above, and the color filter substrate is disposed opposite to the array substrate. The structure and the manufacturing method of the array substrate may refer to FIGS. 5 to 11, and are not repeated herein.

In summary, the embodiments of the present disclosure provide the array substrate, which includes the substrate layer, the insulating layer, the plurality of first electrodes, and the plurality of second electrodes. The insulating layer is disposed on the substrate layer and is defined with the plurality of grooves on one side away from the substrate layer. The plurality of first electrodes are disposed in the grooves, the plurality of second electrodes are disposed on one side surface of the insulating layer away from the substrate layer and outside the grooves, and the plurality of second electrodes and the plurality of first electrodes are insulated from each other. In the present disclosure, by disposing the plurality of first electrodes in the grooves and disposing the plurality of second electrodes on the side surface of the insulating layer away from the substrate layer and outside the grooves, a certain spacing can be formed between the plurality of first electrodes located in the grooves and the adjacent second electrodes located outside the grooves in the direction perpendicular to the plane where the array substrate is located. Therefore, the plurality of first electrodes being separated from the plurality of second electrodes in the direction perpendicular to the plane where the array substrate is located can be realized, the line spacing between the orthographic projection of the plurality of first electrodes on the substrate layer and the orthographic projection of the adjacent second electrodes on the substrate layer can be reduced or even eliminated, and the transmittance can be greatly improved. Therefore, the present disclosure can solve the technical problem of low transmittance in current array substrates.

The array substrate, the manufacturing method thereof, and the display panel provided in the embodiments of the present disclosure are described in detail above. The disclosure herein provides many different embodiments or examples for realizing different structures of the present disclosure, and it is understood that they are only examples and are not intended to limit the present disclosure.

What is claimed is:

1. An array substrate, comprising:
   a substrate layer;
   an insulating layer disposed on the substrate layer and defined with a plurality of grooves on one side away from the substrate layer;
   a plurality of first electrodes disposed in the grooves; and
   a plurality of second electrodes disposed on one side surface of the insulating layer away from the substrate layer and outside the grooves, wherein the plurality of second electrodes and the plurality of first electrodes are insulated from each other;
   wherein the plurality of first electrodes comprise a first trunk electrode and a plurality of first branch electrodes arranged in parallel, and the first branch electrodes are electrically connected to the first trunk electrode;
   the plurality of second electrodes comprise a second trunk electrode and a plurality of second branch electrodes arranged in parallel, and the second branch electrodes are electrically connected to the second trunk electrode;
   wherein a spacing between an orthographic projection of the first branch electrodes on the substrate layer in a middle area and an orthographic projection of the second trunk electrode on the substrate layer is greater than a spacing between an orthographic projection of the first branch electrodes on the substrate layer in an edge area and the orthographic projection of the second trunk electrode on the substrate layer.

2. The array substrate according to claim 1, wherein the plurality of first electrodes and the plurality of second electrodes are formed by a same metal deposition process.

3. The array substrate according to claim 1, wherein a spacing between an orthographic projection of the first branch electrodes on the substrate layer and an orthographic projection of adjacent second branch electrodes on the substrate layer is greater than or equal to 0 and is less than or equal to 0.5 μm.

4. The array substrate according to claim 1, wherein a spacing between an orthographic projection of the second branch electrodes on the substrate layer in the middle area and an orthographic projection of the first trunk electrode on the substrate layer is greater than a spacing between an orthographic projection of the second branch electrodes on the substrate layer in the edge area and the orthographic projection of the first trunk electrode on the substrate layer.

5. The array substrate according to claim 3, wherein in a direction perpendicular to a direction from the substrate layer to the insulating layer, a width of the first branch electrodes in an edge area is greater than a width of the first branch electrodes in a middle area; or
   a width of the second branch electrodes in the edge area is greater than a width of the second branch electrodes in the middle area.

6. The array substrate according to claim 3, wherein in a direction from the substrate layer to the insulating layer, a spacing between the first branch electrodes in a middle area and the second branch electrodes adjacent to the first branch electrodes in the middle area is greater than a spacing between the first branch electrodes in an edge area and the second branch electrodes adjacent to the first branch electrodes in the edge area.

7. The array substrate according to claim 3, wherein in a direction from the substrate layer to the insulating layer, a spacing between the plurality of first electrodes and the plurality of second electrodes adjacent to the plurality of first electrodes is a first value, a film layer thickness of the plurality of first electrodes is a second value, and a ratio of the first value to the second value is greater than 10.

8. The array substrate according to claim 7, wherein the first value is greater than or equal to 4000 angstroms and is less than or equal to 20000 angstroms, and the second value is greater than or equal to 300 angstroms and is less than or equal to 1000 angstroms.

9. The array substrate according to claim 1, wherein an included angle formed between a side wall of the grooves and a bottom surface of the grooves is greater than 0 and is less than or equal to 90 degrees.

10. A manufacturing method of an array substrate, comprising following steps:
  manufacturing an insulating layer on a substrate layer;
  defining a plurality of grooves on one side of the insulating layer away from the substrate layer; and
  manufacturing a metal layer on the insulating layer, wherein the metal layer comprises a plurality of first electrodes and a plurality of second electrodes insulated from the plurality of first electrodes, the plurality of first electrodes are disposed in the grooves, and the plurality of second electrodes are disposed on one side surface of the insulating layer away from the substrate layer and outside the grooves;
  wherein the plurality of first electrodes comprise a first trunk electrode and a plurality of first branch electrodes arranged in parallel, and the first branch electrodes are electrically connected to the first trunk electrode;
  the plurality of second electrodes comprise a second trunk electrode and a plurality of second branch electrodes arranged in parallel, and the second branch electrodes are electrically connected to the second trunk electrode;
  wherein a spacing between an orthographic projection of the first branch electrodes on the substrate layer in a middle area and an orthographic projection of the second trunk electrode on the substrate layer is greater than a spacing between an orthographic projection of the first branch electrodes on the substrate layer in an edge area and the orthographic projection of the second trunk electrode on the substrate layer.

11. The manufacturing method of the array substrate according to claim 10, wherein an included angle formed between a side wall of the grooves and a bottom surface of the grooves is greater than 0 and is less than or equal to 90 degrees.

12. A display panel, comprising a color filter substrate and an array substrate, wherein the color filter substrate is disposed opposite to the array substrate, and the array substrate comprises:
  a substrate layer;
  an insulating layer disposed on the substrate layer and defined with a plurality of grooves on one side away from the substrate layer;
  a plurality of first electrodes disposed in the grooves; and
  a plurality of second electrodes disposed on one side surface of the insulating layer away from the substrate layer and outside the grooves, wherein the plurality of second electrodes and the plurality of first electrodes are insulated from each other;
  wherein the plurality of first electrodes comprise a first trunk electrode and a plurality of first branch electrodes arranged in parallel, and the first branch electrodes are electrically connected to the first trunk electrode;
  the plurality of second electrodes comprise a second trunk electrode and a plurality of second branch electrodes arranged in parallel, and the second branch electrodes are electrically connected to the second trunk electrode;
  wherein a spacing between an orthographic projection of the first branch electrodes on the substrate layer in a middle area and an orthographic projection of the second trunk electrode on the substrate layer is greater than a spacing between an orthographic projection of the first branch electrodes on the substrate layer in an edge area and the orthographic projection of the second trunk electrode on the substrate layer.

13. The display panel according to claim 12, wherein the plurality of first electrodes and the plurality of second electrodes are formed by a same metal deposition process.

14. The display panel according to claim 12, wherein
  a spacing between an orthographic projection of the first branch electrodes on the substrate layer and an orthographic projection of adjacent second branch electrodes on the substrate layer is greater than or equal to 0 and is less than or equal to 0.5 μm.

15. The display panel according to claim 12, wherein
  a spacing between an orthographic projection of the second branch electrodes on the substrate layer in the middle area and an orthographic projection of the first trunk electrode on the substrate layer is greater than a spacing between an orthographic projection of the second branch electrodes on the substrate layer in the edge area and the orthographic projection of the first trunk electrode on the substrate layer.

16. The display panel according to claim 14, wherein in a direction perpendicular to a direction from the substrate layer to the insulating layer, a width of the first branch electrodes in an edge area is greater than a width of the first branch electrodes in a middle area; or
  a width of the second branch electrodes in the edge area is greater than a width of the second branch electrodes in the middle area.

17. The display panel according to claim 14, wherein in a direction from the substrate layer to the insulating layer, a spacing between the first branch electrodes in a middle area and the second branch electrodes adjacent to the first branch electrodes in the middle area is greater than a spacing between the first branch electrodes in an edge area and the second branch electrodes adjacent to the first branch electrodes in the edge area.

18. The display panel according to claim 14, wherein in a direction from the substrate layer to the insulating layer, a spacing between the plurality of first electrodes and the plurality of second electrodes adjacent to the plurality of first electrodes is a first value, a film layer thickness of the plurality of first electrodes is a second value, and a ratio of the first value to the second value is greater than 10.

19. The display panel according to claim 18, wherein the first value is greater than or equal to 4000 angstroms and is less than or equal to 20000 angstroms, and the second value is greater than or equal to 300 angstroms and is less than or equal to 1000 angstroms.

20. The display panel according to claim 12, wherein an included angle formed between a side wall of the grooves and a bottom surface of the grooves is greater than 0 and is less than or equal to 90 degrees.

* * * * *